United States Patent [19]

Balasubramanian et al.

[11] Patent Number: 5,598,482
[45] Date of Patent: Jan. 28, 1997

[54] IMAGE RENDERING SYSTEM AND ASSOCIATED METHOD FOR MINIMIZING CONTOURS IN A QUANTIZED DIGITAL COLOR IMAGE

[75] Inventors: Thyagarajan Balasubramanian, West Lafayette, Ind.; King Choi; Joseph DiVencenzo, both of Rochester, N.Y.

[73] Assignee: Eastman Kodak Company, Rochester, N.Y.

[21] Appl. No.: 243,433

[22] Filed: May 16, 1994

Related U.S. Application Data

[63] Continuation of Ser. No. 833,865, Feb. 11, 1992, abandoned.
[51] Int. Cl.$^6$ .................................................. G06K 9/48
[52] U.S. Cl. ......................... 382/199; 382/162; 382/270
[58] Field of Search ..................................... 382/23, 50, 17, 382/197, 200, 162, 167, 270; 358/500, 518, 438, 521, 530

[56] References Cited

U.S. PATENT DOCUMENTS

| | | | |
|---|---|---|---|
| 4,366,507 | 12/1982 | Mori | 382/50 |
| 4,415,920 | 11/1983 | Kato et al. | 358/80 |
| 5,025,478 | 1/1991 | Morris et al. | 382/22 |
| 5,083,210 | 1/1992 | Reilly et al. | 358/455 |
| 5,157,741 | 10/1992 | Katayama | 382/54 |

*Primary Examiner*—Joseph Mancuso
*Attorney, Agent, or Firm*—Raymond L. Owens

[57] ABSTRACT

The apparatus and method of the present invention quickly determines the presence of contours in a digital color image by determining the busy and the non-busy (smooth) regions of the original digital color image and determining the luminance variations in the smooth regions of the original digital color image and in a quantized version of the original digital color image. The difference between the luminance variations is compared against a selected threshold value, which if exceeded causes a mark to be associated with the pixel under consideration. For each pixel of the quantized digital color image that is associated with the mark or has a mark associated with a neighboring pixel in a window around the pixel of interest the color of the pixel is selected to minimize and or remove the contour.

13 Claims, 5 Drawing Sheets

5,598,482

IMAGE RENDERING SYSTEM AND ASSOCIATED METHOD FOR MINIMIZING CONTOURS IN A QUANTIZED DIGITAL COLOR IMAGE

This is a Continuation of U.S. application Ser. No. 833,865, filed 11 Feb. 1992 now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

The present invention relates to the field of digital image processing and more particularly to systems and methods for removing contouring effects from a quantized digital image.

BACKGROUND OF THE INVENTION

A portion of the disclosure of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

When processing digital images, particularly color images, it is often necessary to perform a quantizing operation upon the digital values that represent each of the pixels forming the digital image. Color quantization often gives rise to false contouring artifacts in an image formed with these quantized digital values. Contouring occurs when colors of spatially adjacent pixels, that are also close to each other in the color space, Get mapped into different colors by the quantizing process. This contouring is usually highly objectionable because it appears in smooth regions where the human visual system has relatively low tolerance to noise. In particular, the noise is of a correlated nature, taking the form of lines and circles, and hence is easily noticed by the human eye.

The removal of contouring effects in images has been the subject of a number of patents and papers. What the present solution to the problem offers is a quicker way to identify the existence of contours and of applying a correcting algorithm to only those regions of the image that contain the contours.

SUMMARY OF THE INVENTION

In the preferred method of this invention for minimizing the contouring effects in a quantized digital color image there is provided the steps of:

a) determining the luminance value for each color pixel of the original and the quantized digital color image;

b) determining busy and non-busy (smooth) regions of the original digital color image; and c) for smooth regions determining the luminance variations (gradients) in the original digital color image;

d) for the same smooth regions determining luminance variations in the quantized digital color image;

e) determining the difference between the original luminance variations and the quantized variations;

f) selecting a threshold value indicative of contours;

g) comparing the difference of step e) with the selected threshold value of step f) and if the threshold is exceeded mark the presence of a contour at the associated pixel;

h) for each pixel of the quantized digital color image, search for a contour mark in a window of surrounding pixels; and i) if a contour is found determine a new color to place at the pixel.

From the foregoing it can be seen that it is a preferred object of the present invention to provide a system and an associated method for removing contouring effects from a quantized digital color image.

It is another object of the present invention to provide a means for quickly determining the contours of a quantized digital color image.

It is yet another object of the present invention to provide a method for removing image contours composed of two or more colors in a quantized digital color image.

These and other objects of the present invention will become more apparent when taken in conjunction with the following description and drawings wherein like characters indicate like parts and which drawings form a part of the present invention.

DESCRIPTION OF THE PREFERRED EMBODIMENTS

Figure 1:
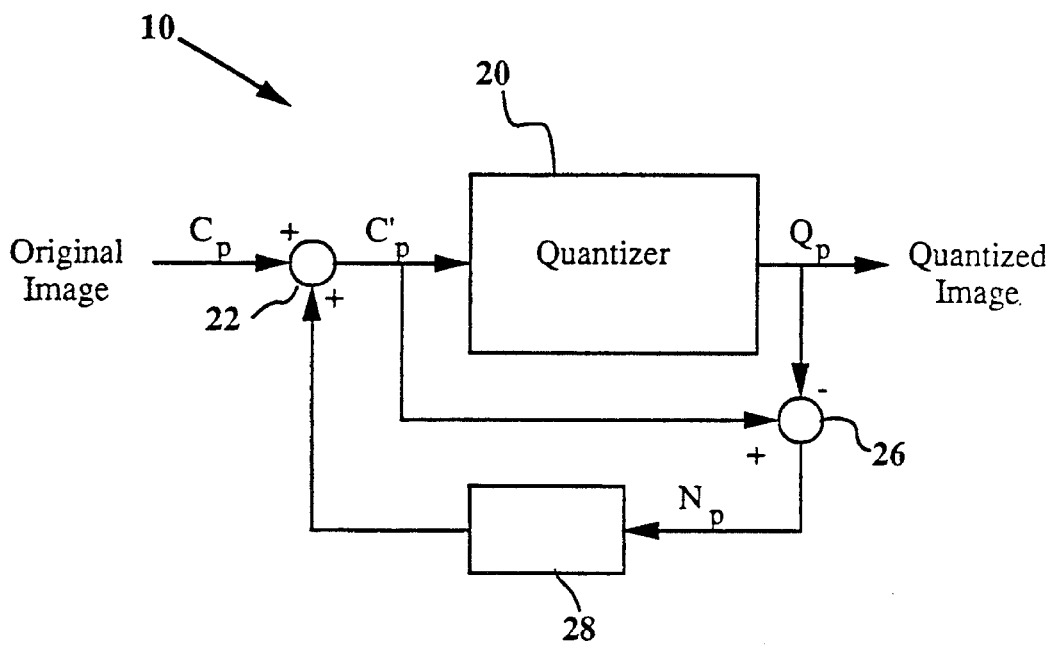
FIG. 1, illustrates in block diagram form a prior art quantizer that may be used with the present invention to provide quantized input pixel values $Q_p$.

Referring to FIG. 1, a prior art quantizer system 10 that may be used with the present invention to provide quantized input signals $Q_p$ representing an original image is shown comprised of; a quantizer 20, having as an input the signal $C'_p$ that is received from the output of a summer 22. The summer 22 receives as inputs the original image signal $C_p$ and the output from an error diffusion filter 28. A difference node 26 receives as inputs the signals $C'_p$ and $Q_p$ and provides on its output the difference between these two signals, the signal Np, which is directed to the input of the error diffusion filter 28.

In operation, the pixels of an original image are scanned in a raster fashion, to form an unquantized color vector $C_p=[R,G,B]^t$ at pixel location p. The color vector $C_p$ is modified by adding to it a weighted sum of previous quantization errors (the weights being applied by the filtering action of filter 28) to form a modified color vector $C'_p$. The modified color vector $C'_p$ is then quantized to the closest color $Q_p$ in a palette of color values and the resulting quantization error $N_p$ is determined in the difference node 26 and forwarded to other unquantized pixels $C_p$ via the error diffusion filter 28 and the summing node 22. The error diffusion filter 28 provides a high-pass characteristic to the signal $N_p$. This is desirable, since the human visual system is less sensitive to error components at high frequencies. Hence, in smoothly varying regions, error diffusion adds a high frequency noise pattern to the image that breaks up the correlated nature of quantization errors and eliminates contouring. One potential disadvantage with this approach is that if errors accumulated by the error diffusion filter are not cancelled by other errors of opposite polarity, the error diffusion filter may become unstable and yield undesirable artifacts.

Figure 2:
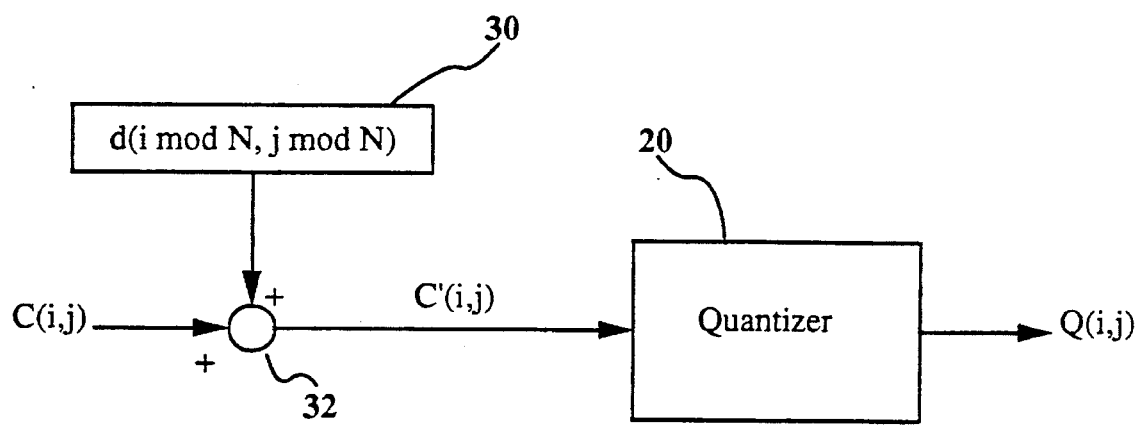
FIG. 2, illustrates in block diagram form a prior art dithering technique incorporating a quantizer for providing input pixel values $Q(i,j)$.

Referring to FIG. 2, in another prior art method, a periodic noise pattern $d(k,l)$ may be added to the image prior to quantization. The noise pattern is generated by generator 30 and summed with the signal $C(i,j)$ to form the signal $C'(i,j)$ in the summer 32. The signal $C'(i,j)$ is then directed to the quantizer 20. The equation for that action is as follows:

$$C'(i,j) = C(i,j) + d(i \bmod N, j \bmod N)$$

where $d(k,l)$ is an N×N dither matrix with vector entries. The color $C'(i,j)$ is then quantized to the closest color $Q(i,j)$ in the palette. The matrix d is chosen to have an average value of zero and an energy spectrum with a high frequency characteristic. Regions of constant color are quantized to a set of similar colors in the palette, hence breaking up correlated contouring errors. FIG. 2 illustrates the process with the quantizer 20 receiving the signal $C'(i,j)$, that has been formed by the use of a dithering matrix 30 providing its output signal to an input of a summing node 32. A major difficulty in applying ordered dither to color images with image-dependent palettes is that since the colors are not uniformly distributed in the color space, the distance between neighboring colors varies significantly throughout the space, and thus it is almost impossible to obtain a constant dither matrix that will satisfactorily dither all areas of constant color in the image. C. Bouman et al., in their publication "Color Image Display With a Limited Palette Size", Proc. of SPIE Conf. on Visual Comm. and Image Proc., vol. 1199, pp. 522–533, Philadelphia, Pa., Nov. 8–10, 1989 suggest a method to locally dither a pixel between only two palette colors, $Q_1$ and $Q_2$ that are closest to the actual pixel color. The dither signal is then the vector $(Q_2-Q_1,)$ modulated by a matrix of scalar dither values $d(k,l)$ that fall in the range $[-\frac{1}{2}, \frac{1}{2}]$. The disadvantage of this approach is that finding the two closest palette colors to a pixel is computationally intensive. Further, the colors $Q_1$ and $Q_2$, and hence the orientation of the dither matrix, may change rapidly in a small spatial region. In such a situation, it is possible that contouring will not be eliminated at all.

Selective Contour Removal

Both error diffusion and ordered dithering sacrifice spatial resolution for an increased number of perceived colors. However, if error diffusion or ordered dithering is performed on the entire image, there may be some loss in spatial detail, especially around edges and other busy areas of the image. The present invention provides an algorithm that performs selective contour removal. The novelty in this approach is that the entire image does not have to be examined for the presence of contours, and only regions that are in the window of contours are involved in the contour removal step. Furthermore, unlike conventional dithering, the contour removal is not integrated with the pixel quantization step, i.e. no remapping of input colors to palette colors is performed during the contour removal. In fact., it is assumed that both the digitized original and the quantized digital color images are available as inputs to the algorithm. The procedure will be described in two steps: contour detection and contour removal.

Contour Detection

Figure 3:
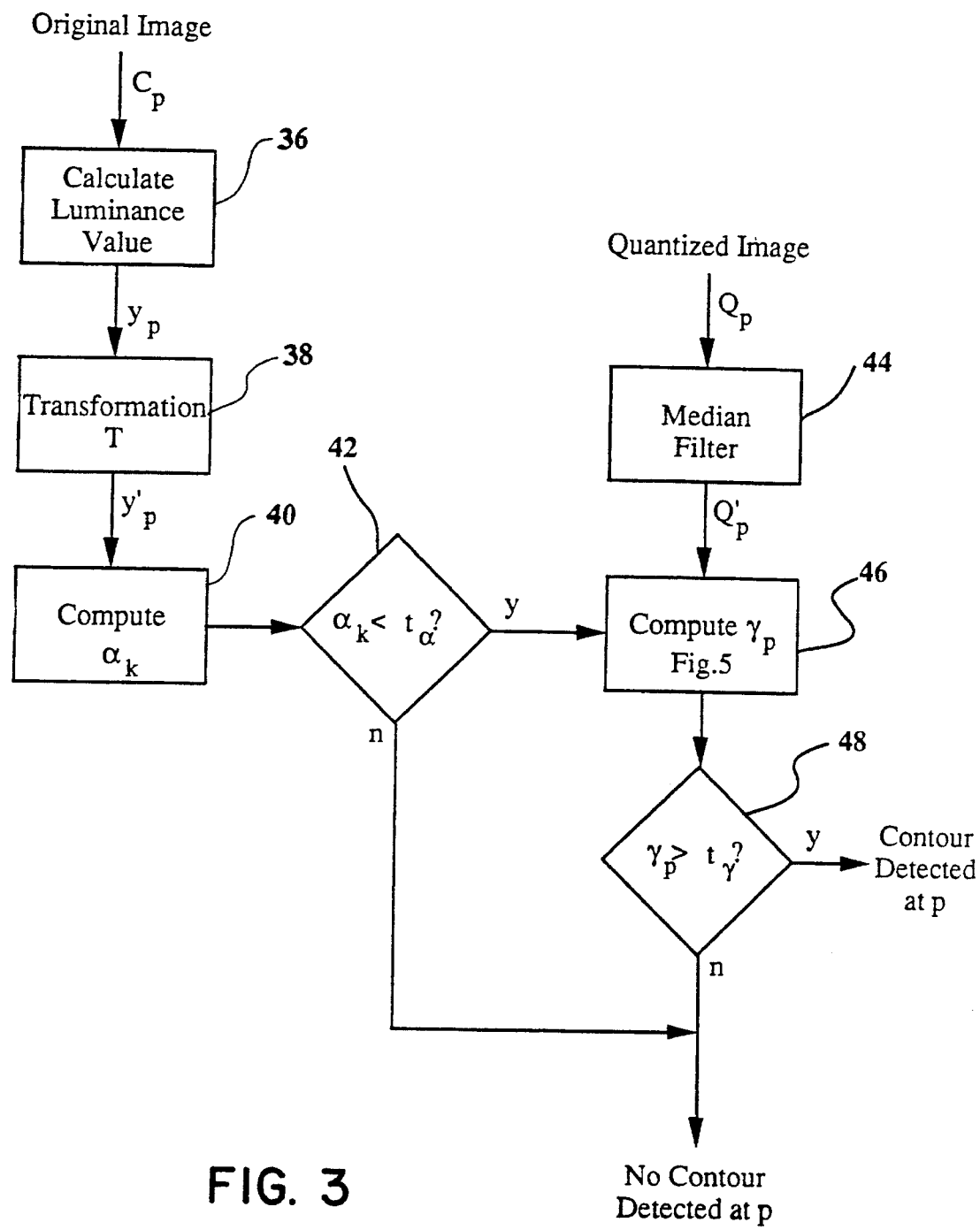
FIG. 3, illustrates in flow chart diagram form the comparison of the pixel values of the original image against the pixel values from the quantized version of the original image to determine the existence of a contour.
Figure 4:
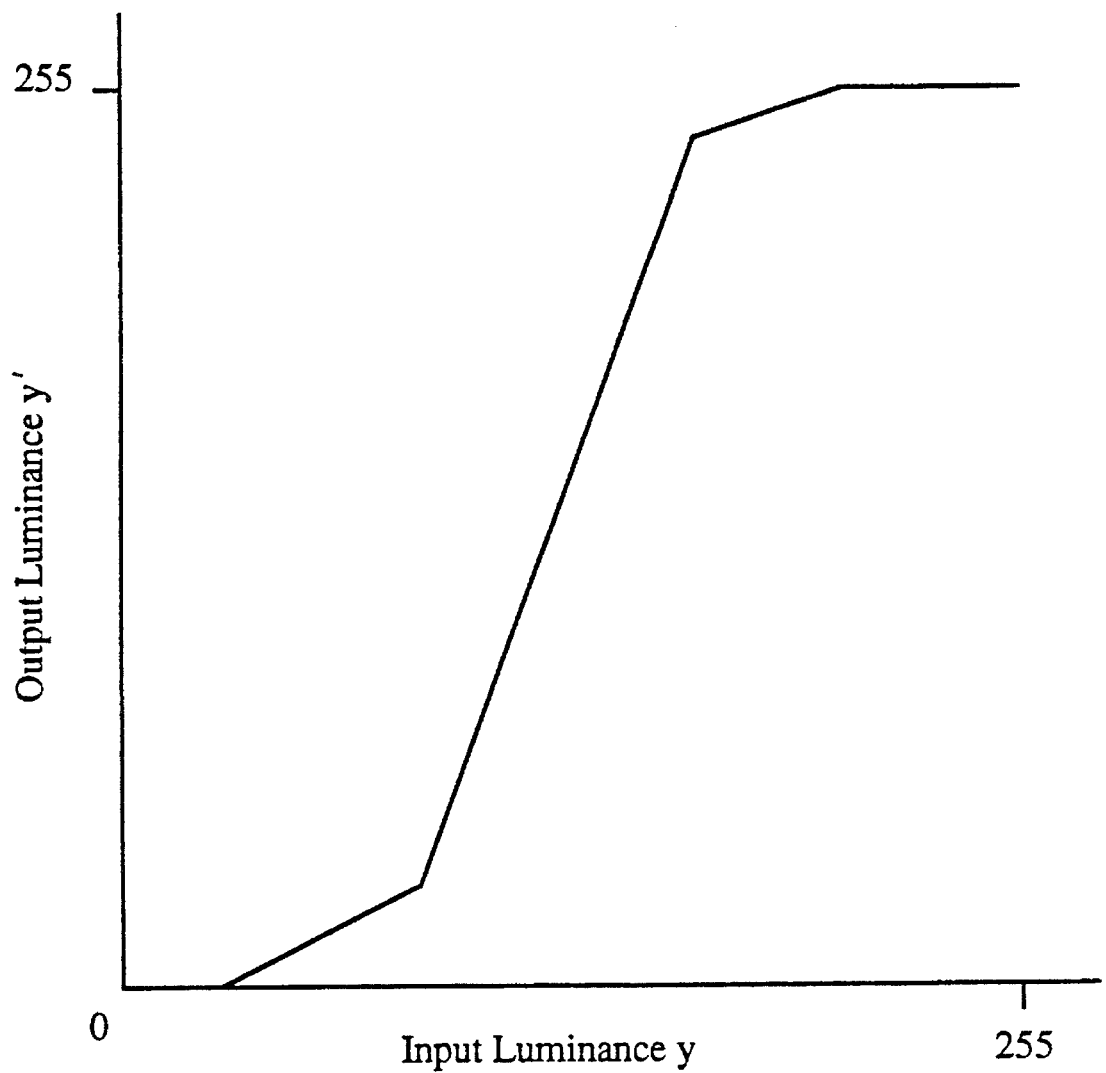
FIG. 4, is a chart illustrating a desired luminance transform for enabling contour detection.

Referring to FIG. 3, to detect the presence of contours in a quantized color image, the image is examined for regions where the luminance values vary smoothly in the original image, but in discrete steps in the quantized image. Luminance variation is used, since the human visual system is more sensitive to successive changes in luminance than to changes in chrominance. The luminance value $y_p$ of a color vector $C_p$ is given by $y_p = a' C_p$, where for simplicity, the value of $a'$ may be chosen to be $=[\frac{1}{4}, \frac{1}{2}, \frac{1}{4}]$ for the R,G,B components, respectively (a higher weight is assigned to the green component as this signal contains the highest luminosity). The calculation is performed in block 36. A transformation may also be performed such as a transformation $y_p = T[y_p]$, where T is a predetermined transform that may be used to reflect the different sensitivities of the human observer at different luminance levels. The transformation T is performed in box 38. An example of a piecewise linear transform that may be used is shown in FIG. 4. This transform accentuates luminance differences at mid-tone levels, and suppresses those at the very high and low end. For ease of notation, in subsequent discussions, it will be assumed that $y_p$ is the transformed luminance value. In order to restrict the search for contours to smooth regions of the image, the original image is divided into blocks of 8×8 pixels and an activity measure $\alpha_k$ is assigned to an associative block k to be the mean absolute deviation of luminance values in the block:

$$\alpha_k = \sum_p |y_p - y_k|$$

wherein $y_k$ is the average luminance value in block k and the summation is over all pixels in the block k. Block 40 computes $\alpha_k$. Contours are determined to exist only in blocks where $\alpha_k$ is below some predefined threshold $t_\alpha$. As compared in decision block 42, if $\alpha_k$ is greater than or equal to the threshold, the block k is not a smooth region. If $\alpha_k$ is smaller than the threshold, the block k is a smooth region. This eliminates searching for contours around edges and other busy areas. The threshold $t_\alpha$ may be varied depending on how strict a smoothness criterion one wishes to establish. For simplicity, a fixed activity threshold may be selected by observing output images generated with selected values of $t_\alpha$. As a measure of contouring, a determination is made as to the differences between the luminance gradients of the original image and the quantized image. With the existence of luminance gradient differences above a predetermined magnitude, indicating the existence of a contour, the blocked system 46, illustrated in detail in FIG. 5 may be used to generate the luminance gradients and the luminance gradient differences. The quantized image $Q_p$ is directed through a median filter 44 to provide the input to the compute $\gamma_p$ block 46.

Figure 5:
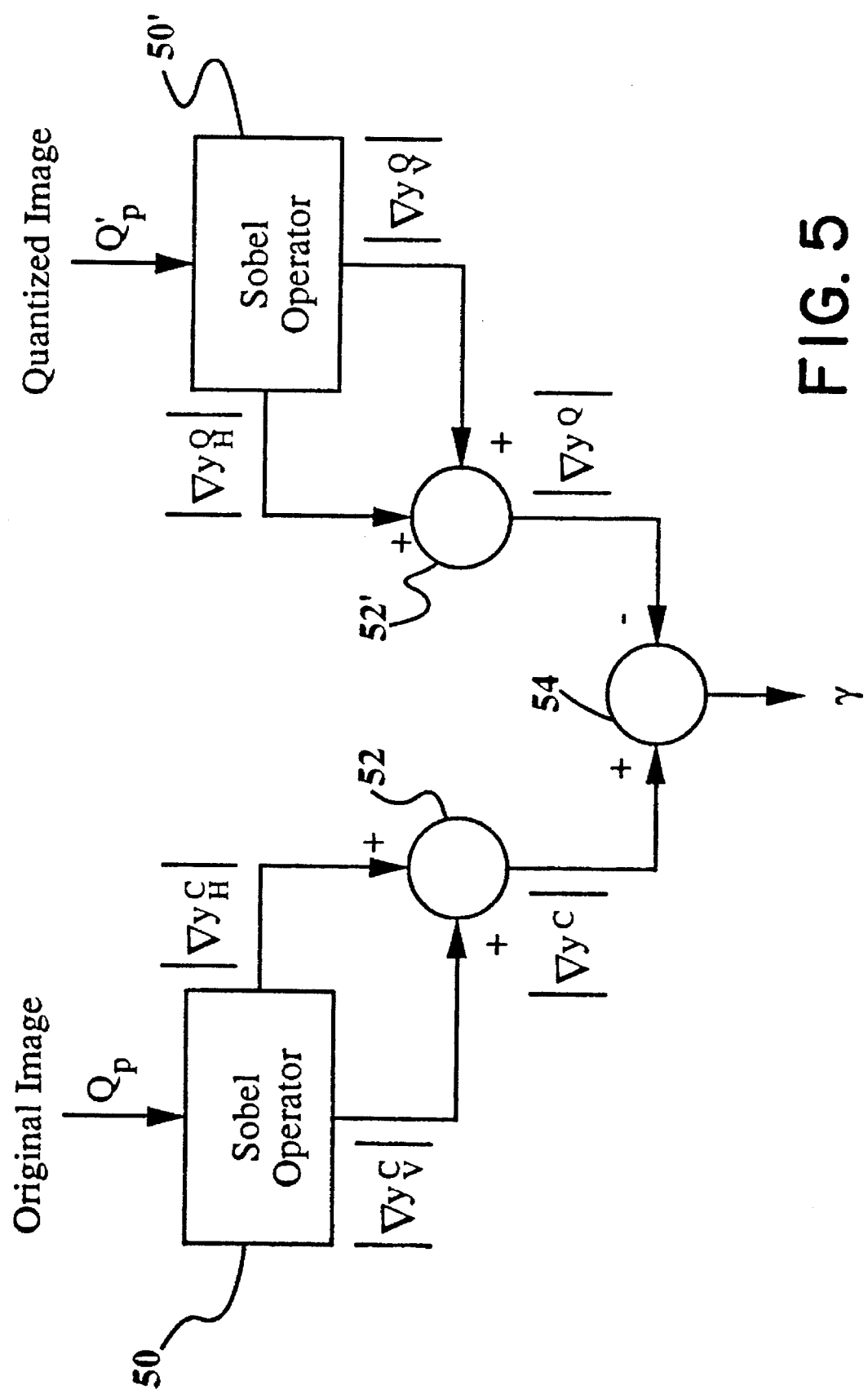
FIG. 5, is a block schematic diagram illustrating a system for generating luminance gradients and luminance gradient differences.

Referring to FIG. 5, the digitized original color image is applied to a Sobel operator function block 50 which provides at its outputs the absolute values $\nabla y_H$ and $\nabla y_V$ which in turn are summed in a summer 52. In a like fashion the quantized digital color image is applied to the Sobel operator function block 50' and the summer 52'. A differencer 54 determines the difference $\gamma$ between the outputs from summer 52 and summer 52'. The following equation is implemented in the blocked system of FIG. 5:

$$\nabla y = |\nabla y_H| + |\nabla y_V|$$

where $\nabla y_H$, and $\nabla y_V$ are the outputs of the Sobel operator in the horizontal and vertical directions respectively. The Sobel operator is described in the text, "Digital Image Processing" authored by R. C. Gonzalez, P. Wintz and published by Addison-Wesley, 1987. If $\nabla y_p^Q$ and $\nabla y_p^C$ are denoted as the gradients of the quantized and original images at location p respectively, then we define a measure of contouring, $\gamma_p$ as:

$$\gamma_p = \nabla y_p^Q - \nabla y_p^C$$

Since, in practice, the Sobel operator yields smooth gradients the contour maps are smeared and not well defined. Also, the edge maps are in general noisy because quantization sometimes introduces graininess in flat regions, and this yields high values of $\gamma_p$. In order to obtain a more accurate and cleaner contour map the quantized image is filtered with the median filter 44 before computing gradients. This has the effect of removing any graininess introduced by quantization and yields thinner contour edges. To further refine the contours, the values of $\gamma_p$ that are below a predetermined contour threshold $t_p$ are discarded. The operation is performed in the decision block 48. Again, the contour threshold may be varied depending on how selective one would like to be. Finally, contours at locations where the gradient in the original image is less than 4.0 are discarded (i.e. where the image is virtually flat or in other words smooth). After obtaining the final contour map, there is no longer any need for the original image. The subsequent processing operates only on the quantized image.

Contour removal

Figure 6:
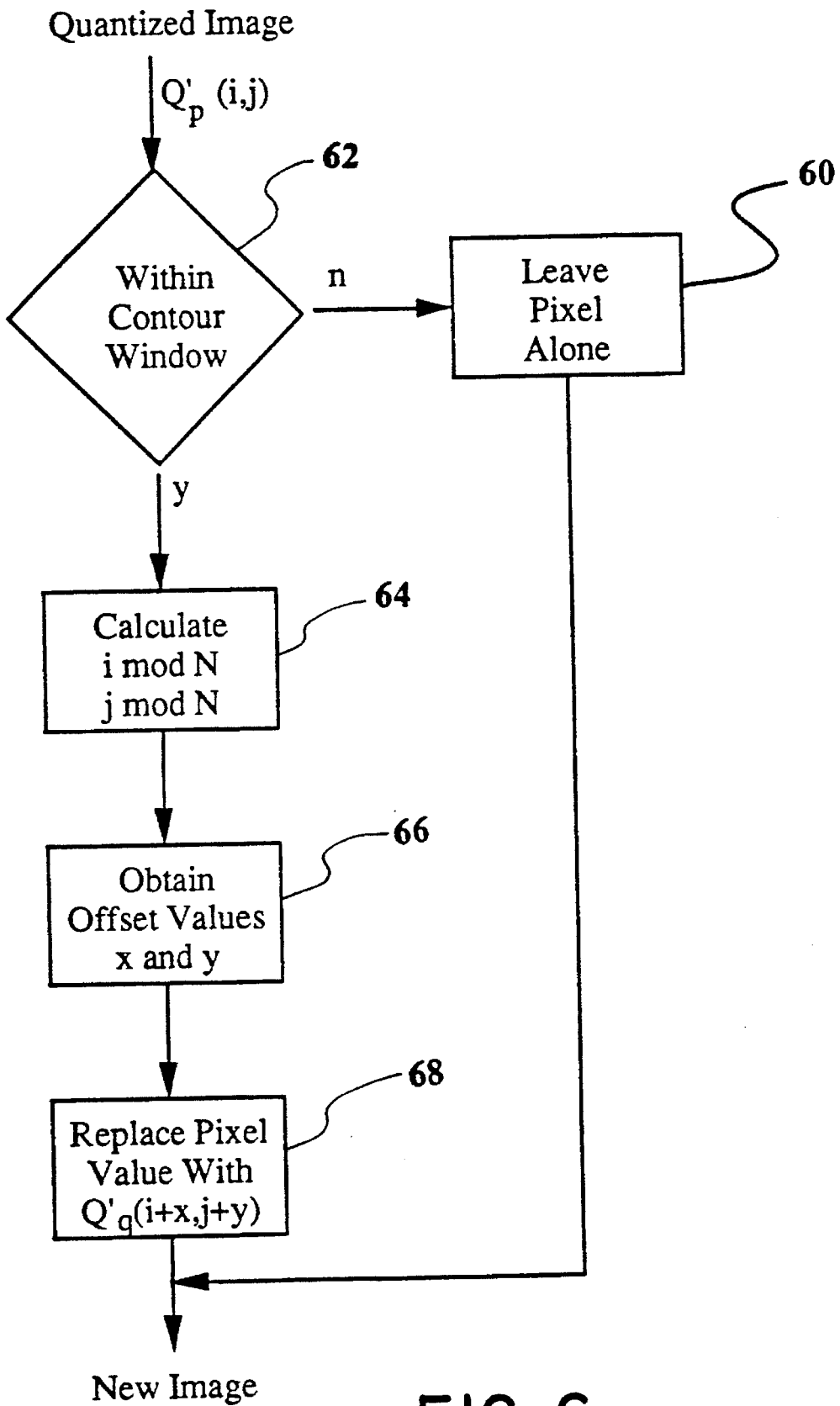
FIG. 6 illustrates in flow chart form the operation of the pixel replacement algorithm of the present invention.

The basic idea of this step is for the value of each pixel p in the window of a contour pixel to be replaced with the value of pixel q as determined by two N×N offset matrices $D_x$ and $D_y$. If p is not in the window of any contour pixel, its value is left unchanged. To illustrate this algorithm, let the position of p=(i,j) be in the window of a contour pixel. The offsets x and y are extracted from the offset matrices $D_x$ and $D_y$, wherein x=$D_x$ (i mod N, j mod N) and y=$D_y$ (i mod N, j mod N) and wherein N is the size of the offset matrices. The position of the pixel q is given by (i+x, j+y). The flow chart of FIG. 6 illustrates these steps operating upon the pixel values from a quantized image with each pixel value represented by $Q'_p(i,j)$ replaced by $Q'_q(i+x, j+y)$. In the decision block 62 the pixel value is examined to determine if it is within the contour window, if not, the pixel value is left alone as per box 60 and the unaltered pixel is forwarded to be part of the new image. If the pixel value is within the window of a contour the calculations of block 64 are performed to obtain the offset values x and y as stated in box 66. With the offset values determined, the value of $Q'_q(i+x, j+y)$ is substituted for $Q'_p(i,j)$ as per block 68 to form the new image.

Implementation

In the implementation of this algorithm, several parameters are obtained heuristically by looking at their effects on images. The median filter used was a three point one-dimensional median filter applied first in the horizontal and then in the vertical direction. This filter is both computationally simple to implement and effective in removing noise and providing thinner contour edges. It is interesting to note that although filtering improves the contour detection, it only marginally improves the final quality of the image. Also, in practice, the extra time taken to perform the filtering is offset by the time saved at the end due to the filter reducing the number of contour regions to be examined.

In the contour removal algorithm there are three parameters that are to be considered. The first is the size of the window. In the preferred embodiment of the invention a window size of 3×3 is used. The larger the window, the smoother the ramp will become. The second parameter is the entries in the offset matrix. The range of −3 to +3 was used in the implementation. As an observation the larger the range of the entries, the smoother the ramp will become. The third parameter is the size of the offset matrices. The preferred embodiment used two 4×4 matrices in the initial implementation. The larger the offset matrices, the less structure there will be in the resulting image.

Appendix A is a listing of the computer programs that were used to implement the invention. The contour detection program was run on a SUN workstation with UNIX and the pixel replacement program was run on a MAC IIci personal computer. Although a computer system is not shown in the Drawings, for purpose of simplicity, it is understood that the present invention requires a computer in order to perform the functional steps of processing digital images with any speed that would have commercial value.

Results and Discussion

One of the advantages of the present approach is that since the method is only performed around contours in smooth regions, the images do not suffer a loss in spatial detail around edges and other busy regions. The algorithm imposes no restrictions on the structure of the palette, since no nearest neighbor searches in the color space are necessary. Finally, unlike error diffusion, the present process is memoryless, and hence, it is possible to select a desired portion of the image and apply the rendering algorithm to it without introducing a patchy effect, as might be the case with error diffusion when applied only to a portion of the image. Since processing a small portion of the image is clearly faster than processing the entire image, this could be useful from the standpoint of a practical rendering application.

While there has been shown what is considered to be the preferred embodiments of the invention, it will be manifested that many changes and modifications may be made therein without departing from the essential spirit of the invention.

APPENDIX A

```
DITHER.C                                                          Page 1 1
Monday, November 18, 1991   12:21 PM                      (C) Copyright 1991
                                                          Eastman Kodak Company
                                                          ALL RIGHTS RESERVED
/*********************************************************************/
/* dither.c                    Raja Balasubramanian
                   July 22, 1991     */

/***       COPYRIGHT EASTMAN KODAK COMPANY       AUG. 12, 1991 ***/
/*         --------------------------------                      */

/* This program detects contours in a palettized color image and    */
/* performs local dithering between 2 adjacent colors at these contours */

/* INPUTS:                                   */

/* 1) 3 frames of original image                    */
/* 2) index file and color map of palletized image           */
/* 3) Number of quantization levels             */
/* 4) Output (dithered) index file              */
/* 5) Image dimensions                     */
/* 6) File containing piecewise linear luminance transformation    */

/* The following steps are performed:                  */

/* 1) CONTOUR DETECTION                         */

/* Median filter the quantized index image.           */
/* Obtain luminance components of original and quantized images.    */
/* Compare luminance gradients of original and quantized images.    */
/* in smooth regions of the image and use this as a measure of     */
/* contouring.                         */

/* 2) LOCAL DITHERING                           */

/* At each contour point, obtain 2 predominant colors in a neighborhood. */
/* In the vicinity of contours, calculate fractions of the 2 colors */
/* bordering each contour.                    */
/* Perform local dithering by comparing the fractions to a conventional */
/* dither matrix that repeats periodically over the image.     */

/*********************************************************************/
#include     <stdio.h>
#include     <stdlib.h>   /* for random number generator    */
#include     <math.h>
#include     "param1.h"   /* contains image dimensions, etc */

/* The following variables are defined in the file "param.h":       */

/* Variable     Value         Synopsis
   --------     -----         --------                  */
/* max          600       max image height & width */
/* nvalues      256       max number of quantization levels */
/* bsize        8         activity block size */
/* nblocks      max/bsize max # of activity blocks per image row */
/* mwsize       5         max median window size */
/* msize        5         default median window size */
```

```
DITHER.C                                                              Page 2
Monday, November 18, 1991  12:21 PM /* wsize    9          window size for computing dither fractions */
/* athresh      400    luminance activity threshold    */
/* gthresh  5          gradient threshold for flatness criterion */

/* STRUCTURES */
/* 1) structure for gradient at a pixel:
      Could be used to include magnitude and direction information;
      currently contains only magnitude information. */ struct gradient {int mag; };

/* 2) structure to contain information about 2 colors at boundary of
      contour and the relative proportion of these 2 colors */ struct dither {unsigned char color1;
        unsigned char color2;
        int dvalue; };

/* external variables */ unsigned char lumim[max][max], lumq[max][max]; /* luminance components */ unsigned char   ri[max],gi[max],bi[max],
        histo[256],hstind[100],
        quant[max][max],
        out[max][max];

int maxgrad,cnt,cnt1,width,height,ncolors,xbeg,xend,ybeg,yend,mheight,
    mwidth;
long int avgrad;

/*******************************************************************/
main()
{
    extern int maxgrad,cnt,cnt1,width,height,mheight,
            mwidth,ncolors,
            xbeg,xend,ybeg,yend;
    extern long int avgrad;

int     nheight,nwidth,kk,ibstart,jbstart,ibend,mopt,copt,
        i1,j1,bvert,bhor,mg,istart,jstart,sum,wsize2,nc1,
        fri,fgi,fbi,fq,fqo,fo,fm,fout,finopt,imopt,sobel(),maxcont,
        maxcnt,tmp1,tmp2,thresh1,thresh2,transopt,a[nvalues],popt;

int rq[256],gq[256],bq[256],dsize,dsize2,id,dopt,
        sum1,sum2,shift,ishift,flag,flag1,cntind,colcount[2][15],
        jmark,jdiff,col1,col2,jcurrent,icent,jcent,rt,gt,bt,t;

float   activity[nblocks][nblocks],rthresh,ftemp,cthresh,
        maxact,ct,at,getact(),scale,df[4][4],log(),fraction;
```

```
DITHER.C                                                            Page 2/5
Monday, November 18, 1991 12:21 PM register int i,j,ii,jj,k;

struct gradient *contour[max][max],*gradalloc();
    struct dither *weight[max][max],*walloc();

extern unsigned char ri[max], gi[max], bi[max],quant[max][max],
              out[max][max],lumim[max][max],lumq[max][max];

unsigned char temp[max],*rp,*gp,*bp;

char fname[30];
    FILE    *fp,*fp1,*fpd,*fopen();
/*********************************************************************/ printf("\n*Detects Contours and Performs Local Dithering *\n");
    fflush(stdout);

/* read in image file names */
    fri = fgi = fbi = fq = fqo = fo = fout = -1;

while (fri == -1) {
     printf("\nOriginal frame 1 ?");
     scanf("%s",fname);
     fri = open(fname, 0);
    } while (fgi == -1) {
     printf("\n    frame 2 ?");
     scanf("%s",fname);
     fgi = open(fname, 0);
    } while (fbi == -1) {
     printf("\n    frame 3 ?");
     scanf("%s",fname);
     fbi = open(fname, 0);
    } while (fqo == -1) {
     printf("\nQuantized image file ? ");
     scanf("%s",fname);
     fqo = open(fname, 0);
    }

/*  while (fq == -1) {
     printf("\nMedian Quantized image file  ?");
     scanf("%s",fname);
     fq = open(fname, 0);
    }
*/ fp1 = NULL;
    while (fp1 == NULL) {
```

DITHER.C
Monday, November 18, 1991  12:21 PM

```
    printf("\n color list   ?");
    scanf("%s",fname);
    fp1 = fopen(fname, "r");
   }
   printf("\nNumber of colors in list (max = 256) ?");
   scanf("%d",&ncolors);

/* read in color list into arrays rq,gq,bq */
   for (i=0; i<ncolors; i++){
    fscanf(fp1,"%d%d%d%d\n",&j1,&rt,>,&bt);
    rq[i] = rt; gq[i]=gt; bq[i] = bt;
   } while (fout == -1) {
    printf("\noutput index image file ?");
    scanf("%s",fname);
    fout = creat(fname, 0644);
   } printf("\nenter width,height of image   ");
   scanf("%d%d",&mwidth,&mheight);

printf("\nprocessing entire image(0) or portion(1) ?");
   scanf("%d",&popt);

if (popt == 0) {
   xbeg = ybeg = 0;
   xend = width = mwidth; yend = height = mheight;
   }
   else {
    printf("\nEnter starting x,y (upper left)");
    scanf("%d%d",&xbeg,&ybeg);

printf("\nEnter finishing x,y (lower right)");
    scanf("%d%d",&xend,¥d);

height = yend - ybeg;  width = xend - xbeg;
   } /* else */ printf("\nscale luminances(0) or not(1) ?");
   scanf("%d",&transopt);

if (transopt == 0) {
    fp = NULL;
    while(fp == NULL) {
     printf("\nluminance transformation file ?");
     scanf("%s",fname);
     fp = fopen(fname, "r");
    } for (i=0; i<nvalues; i++) fscanf(fp,"%d",&a[i]);
   }
```

DITHER.C
Monday, November 18, 1991 12:21 PM

Page 5/7

```c
    printf("\nPerform(0) or omit(1) filtering on quantized image ? ");
    scanf("%d",&mopt);

printf("\nCreate contour file(0) or not (1) ?");
    scanf("%d",&copt);
    if (copt == 0) {
     fo = -1;
     while (fo == -1) {
      printf("\ncontour image filename ? ");
      scanf("%s",fname);
      fo = creat(fname, 0644);
     }
    } printf("\ndeterministic(0) or random(1) dither ? ");
    scanf("%d",&dopt);
    if (dopt == 0) {       /* open dither matrix file */
      fpd = NULL;
      while (fpd == NULL) {
       printf("\ndither matrix file ?");
       scanf("%s",fname);
       fpd = fopen(fname, "r");
      }
    } /* if */
/* go through and compute activity info in image subblocks; where
   activities are low, compare gradients of original and quantized images;
   the difference in gradients is an indication of contouring */ bhor = width/bsize;
    bvert = height/bsize;

if (popt == 1) {
     if ((width%bsize) >0) bhor ++;
     if ((height%bsize) >0) bvert ++;
    } ibstart = ybeg/bsize; /* beginning activity block */
    jbstart = xbeg/bsize;

maxact = 0.0;

/* initialize */
    for (i=ibstart; i<ibstart+bvert; i++)
     for (j=jbstart; j<jbstart+bhor; j++) activity[i][j] = 0.0;

for (i=ybeg; i<yend; i++)
     for (j=xbeg; j<xend; j++) {
      contour[i][j] = gradalloc();
      contour[i][j]->mag = 0;
     } shift = log((float)bsize)/log(2.0);
```

```
DITHER.C                                                                    Page 6/8
Monday, November 18, 1991  12:21 PM /* image loop */ if (popt != 0) {        /* get to correct location in file */
    lseek(fri, (long)(ybeg*mwidth),0);
    lseek(fgi, (long)(ybeg*mwidth), 0);
    lseek(fbi, (long)(ybeg*mwidth), 0);
    } for (i=ybeg; i<yend; i++) {

/* read in original image a row at a time */
        read(fri, ri, mwidth);
        read(fgi, gi, mwidth);
        read(fbi, bi, mwidth);

/*  compute luminance components */
        rp = ri + xbeg; gp = gi + xbeg; bp = bi + xbeg;

for (k=xbeg; k<xend; k++) {
        lumim[i][k] =    ((*gp)>>1)
                + (((*rp) + (*bp))>>2);
/*      lumim[i][k] = *gp; * simplified luminance computation */
        rp++;
        gp++;
        bp++;
        } /* k */
    } /* i */

/* obtain block activity measure from luminance array "lumim"  */
        for (i=ibstart; i<ibstart+bvert; i++) {
        istart = i << shift;
        for (j=jbstart; j<jbstart+bhor; j++) {
        jstart = j << shift;
        at = activity[i][j] = getact(istart,jstart,bsize,bsize);
        maxact = (at > maxact) ? at : maxact;
        }

} /* i */ printf("\nmax luminance activity = %f\n",maxact);

/*  printf("quit(0) or continue(1) ?");
    scanf("%d",&finopt);
    if (finopt == 0) exit(0);
*/

/* read in quantized image into file "out" */ for (i=0; i<mheight; i++)
     read(fqo,&out[i][0],mwidth);

/* median filter the quantized image and store in array "quant" */
```

DITHER.C
Monday, November 18, 1991 12:21 PM

```c
/* initialize array "quant" */
    for (i=0;i<mheight; i++)
     for (j=0; j<mwidth; j++) quant[i][j]=out[i][j];

if (mopt == 0)
    median3();   /* perform median filtering */

/*  printf("\ncreate median image file(0) or continue(1) ?");
    scanf("%d",&finopt);
    if (finopt ==0) {
    printf("\nmedian image filename ?");
    scanf("%s",fname);
    fm=creat(fname, 0644);

for (i=0; i<mheight; i++)
     write(fm,&quant[i][0], mwidth);

exit(0);
    }
*/

/* obtain luminances of filtered quantized image and store in array "lumq" */
    for (i=ybeg;i<yend; i++)
     for (j=xbeg; j<xend; j++)
        lumq[i][j] = ((gq[quant[i][j]])>>1) +
                ((rq[quant[i][j]] + bq[quant[i][j]])>>2);

/* transform luminance values by piecewise linear transform */
    if (transopt == 0)
     for (i=ybeg; i<yend; i++)
      for (j=xbeg; j<xend; j++) {
       lumim[i][j] = a[lumim[i][j]];
       lumq[i][j] = a[lumq[i][j]];
      }

/* make image dimensions an integer multiple of block size */
    nheight = (height/bsize) * bsize;
    nwidth = (width/bsize) * bsize;

/* Compute gradients of original and quantized images only in
   low activity areas */ maxgrad = avgrad = maxcont = cnt = cnt1 = 0;

for (i=ybeg+1; i<ybeg+nheight-1; i++) {
     ii=i/bsize;
     for (j=xbeg+1; j<xbeg+nwidth-1; j++) {
      jj=j/bsize;
       if (activity[ii][jj] <= athresh) { cnt ++;
      mg = sobel(i,j);    /* returns gradient difference at (i,j) in mg */
      contour[i][j]->mag = mg;
```

DITHER.C
Monday, November 18, 1991 12:21 PM

```
      maxcont = (mg > maxcont) ? mg : maxcont;

} /* if low activity */

} /* j */
  } /* i */

/*  avgrad = (float)avgrad / (float)cnt; */ printf("\n max activity, contouring = %f %d\n", maxact,maxcont);

/*  printf("\nmax, avg grad in orig image = %d %d\n",maxgrad,avgrad);
    printf("\nnumber of pels with grad < 5 = %d\n",cnt1);
*/

/*  printf("quit(0) or continue(1) ?");
    scanf("%d",&finopt);
    if (finopt == 0) exit(0);
*/
    cthresh = (float)maxcont/15.0;

/* initialize array out */
   for (i=0; i<mheight; i++)
    for (j=0; j<mwidth; j++) out[i][j]=0;

/* threshold and binarize contour map and store in array "out" */
   for (i=ybeg+1;i<ybeg+nheight-1;i++) {
    for (j=xbeg+1; j<xbeg+nwidth-1; j++)  { ftemp = (float)(contour[i][j]->mag);
      out[i][j] = (ftemp < cthresh) ? 0 : 1;
    } /* j */
   } /* i */

/* clean up isolated contour points and scale for display */
/* if contour point is isolated in a 5x5 window, remove it */

/* COMMENT OUT FOR NOW*/
/*  for (i=2; i<mheight-2; i++) {
     for (j=2; j<mwidth-2; j++) {
      if (out[i][j] == 1) {
       sum = 0;

* sum all pixels in border of 5x5 square window about (i,j) *
      for (k=-2; k<3; k++)
       sum += (out[i-2][j+k] + out[i+2][j+k]);

for (k=-1; k<2; k++)
       sum += (out[i+k][j-2] + out[i+k][j+2]);

if (sum < 2) out[i][j] = 0; * delete if isolated *
     } * if *
    } * j *
```

DITHER.C
Monday, November 18, 1991  12:21 PM

```
    } * i *
*/

/****************************************************************/
/* go to each contour pel and obtain 2 border colors */

/* initialize weight array */
    for (i=ybeg; i<yend; i++)
      for (j=xbeg; j<xend; j++) {
        weight[i][j] = walloc();
        weight[i][j]->dvalue = -1; }

/* initialize histogram and histogram index arrays */
    for (i=0; i<256; i++) histo[i] = 0;
    for (i=0; i<100; i++) hstind[i] = 0;

/* window size for computing fractions is in external variable wsize */
    thresh1 = (wsize*wsize)/5 ;  /* lower bound for color count */
    thresh2 = wsize*wsize - thresh1;  /* upper bound for count */
    wsize2 = wsize/2;

/* image loop */
    for (i=ybeg+wsize2; i<yend-wsize2;i++)
     for (j=xbeg+wsize2; j<xend-wsize2; j++) { if (out[i][j] == 1) {

/* look for 2 dominant colors in square window around (i,j) */
      k = 0;
/* collect colors in histogram */
       for (ii=i-wsize2; ii<=(i+wsize2); ii++)
        for (jj=j-wsize2; jj<=(j+wsize2); jj++) { if (histo[quant[ii][jj]] == 0) {  /* 1st occurrence of color */
          hstind[k] = quant[ii][jj];
          k++; } histo[quant[ii][jj]] ++;
       } /* jj */ maxcnt = 0;
       for (ii=0; ii<k; ii++)       /* maximum color count */
        if (histo[hstind[ii]] > maxcnt)  {
         maxcnt = histo[hstind[ii]];
         tmp1 = hstind[ii];
        } if (maxcnt > thresh2) out[i][j] = 0;
       else {         /* find 2nd largest color count */
        nc1 = maxcnt;
```

```
        histo[tmp1] = maxcnt = 0;

for (ii=0; ii<k; ii++)
         if (histo[hstind[ii]] > maxcnt) {
            maxcnt = histo[hstind[ii]];
            tmp2 = hstind[ii];
         } if (maxcnt <= thresh1) out[i][j] = 0;
         else{
          if ((nc1 + maxcnt) <= 0) {printf("ERROR - divide by zero!\n");
                     fflush(stdout);
                  exit(0); }
          if (tmp1 <= tmp2) {
           weight[i][j]->color1 = tmp1;
           weight[i][j]->color2 = tmp2;
           weight[i][j]->dvalue = (float)(nc1)/(float)(nc1+maxcnt) * 100. ;
          }
          else {
           weight[i][j]->color1 = tmp2;
         weight[i][j]->color2 = tmp1;
         weight[i][j]->dvalue = (float)(maxcnt)/(float)(nc1+maxcnt) * 100. ;
          }
         }
        } /* else */

/* re-initialize histogram arrays */
        for (ii=0; ii<k; ii++) {
         histo[hstind[ii]] = 0;
         hstind[ii] = 0;
        }
       } /* if out[i][j] == 1 */

} /* j */ if (copt == 0) {
/* reverse scale for display purposes and write to output file */
    for (i=0; i<mheight; i++) {
     for (j=0; j<mwidth; j++)
      if (out[i][j] == 0) out[i][j] = 255;
       else out[i][j] = 0;

write(fo,&out[i][0],mwidth);

for (j=0; j<mwidth; j++)
       if (out[i][j] == 255) out[i][j] = 0;
        else out[i][j] = 1;

} /* i */
/*  exit(0); */
    }
```

DITHER.C  
Monday, November 18, 1991 12:21 PM

Page 123

```c
        printf("\nobtained contour map -quit(0) or cont(1) ?");
        scanf("%d",&finopt);
        if (finopt ==0) exit(0);

/*******************************************************************/
/* compute fractions of colors in contour regions and dither
   quantized image */

/* read in dither matrix into array "df" */ if (dopt == 0) {
        fscanf(fpd,"%d",&dsize);   /* dither matrix size */
        dsize2 = dsize*dsize;
        for (i=0; i<dsize; i++)
         for (j=0; j<dsize; j++) {
          fscanf(fpd, "%d",&kk);
          df[i][j] = (float)kk/(float)dsize2 + 1.0/(2.*(float)dsize2) ;
         }

} /* if dopt == 0 */
        else {
         srand(17);
         for (i=0; i<200; i++) j = rand();
        } lseek(fqo, 0L, 0); /* rewind to beginning of quantized image file */ for (i=0; i<ybeg+8; i++){    /* do not process 1st few lines */
         read(fqo, temp, mwidth);
         write(fout,temp,mwidth); }

/**** Image loop ****/
        for (i=ybeg+8; i<yend-8; i++) {
        read(fqo,temp,mwidth);
        if (dopt == 0) id = i%dsize;

/* hardwiring shift
        shift = 3;  */ ishift = i>>shift;

j = xbeg+8;
        while (j < xend-8) { if (activity[ishift][j>>shift] > athresh) j ++;
         else if (out[i][j] == 1) {
/*        if (i == 35) printf("\nTEST 1 ");     * DEBUGGING */
          fflush(stdout);
/* compute fraction and dither */
         fraction = (float)(weight[i][j]->dvalue)/100.0;
         col1 = weight[i][j]->color1;
```

DITHER.C
Monday, November 18, 1991 12:21 PM

```c
        col2 = weight[i][j]->color2;

if (dopt == 0) rthresh = df[id][j%dsize];
        else rthresh = (float) (rand()) / 2147483647.0;

t = temp[j];
        if (myabs(col2-col1) < 20)

if ((t == col1) || (t == col2))     {
          if ((i==36)&&(j==22)) printf("\n(f < t) = %d",(fraction < rthresh));
          temp[j] = (fraction < rthresh) ? col2 : col1 ;
        }
/*      if ((i == 36) && (j == 22)) {
          printf("\nfraction= %f, rthresh= %f, col1=%d,col2=%d,tempj=%d\n",
             fraction,rthresh,col1,col2,temp[j]);
          fflush(stdout);
        }
*/
        j++;
/*      if (i == 35) printf("\nTEST 2 ");    * DEBUGGING */
        fflush(stdout);
        }
        else {
         ii=i-wsize2;
         flag = 0;

/* go through square window and look for contour in vicinity */ while((ii <= i+wsize2) && (flag == 0)) {
          jj = j - wsize2;
          while((jj <= j+wsize2) && (flag == 0)){
/*          if ((i==93) && (j==50))
            if ((ii==94) && (jj==50-wsize2))
          printf("\ni=%d,j=%d,ii=%d,jj=%d,out[ii][jj]=%d\n",
            i,j,ii,jj,out[ii][jj]);
              fflush(stdout);
*/
          if (out[ii][jj] == 1) {
            flag = 1;  jdiff = jj - (j-wsize2);
            jcurrent = j;
            col1 = weight[ii][jj]->color1;
            col2 = weight[ii][jj]->color2;
          }
          jj++;
          } /* jj */
          ii++;
/*        if ((i==93) && (j==50)) printf("\ni+wsize2=%d,ii=%d\n",
                    i+wsize2,ii);
*/
        } /* ii */
```

DITHER.C
Monday, November 18, 1991 12:21 PM

Page 325

```c
        if (flag == 0) j++;   /* no contour in vicinity */
        else {
/* compute color counts for 2 colors in square neighborhood */
        for (jj= j - wsize2; jj<=j+wsize2; jj++){
          colcount[0][jj-j+wsize2] = colcount[1][jj-j+wsize2] = 0;
          for (ii=i - wsize2; ii<= i+wsize2; ii++) {
           if (quant[ii][jj] == col1) colcount[0][jj-j+wsize2] ++;
             else if (quant[ii][jj] == col2) colcount[1][jj-j+wsize2] ++;

} /* ii */
        } /* jj */
         sum1 = sum2 = 0;
         for (jj=0; jj<wsize; jj++) {
           sum1 += colcount[0][jj]; sum2 += colcount[1][jj]; } flag1 = 0;
         while((flag1 == 0) && (j <= jcurrent+jdiff)
         && (j < xend-8)) {
          if ((sum1+sum2) == 0) {/*printf("\nERROR, zero color counts!");
                    fflush(stdout);*/
                    flag1 = 1; j++;} else {
          if (myabs(col2-col1) < 20)
          if ((temp[j] == col1) || (temp[j] == col2)) {
          weight[i][j]->dvalue = mynint((float)(sum1*100)/(float)(sum1+sum2));

/* ensure graceful roll-off of fractions in horiz. and vertical directions */ if (weight[i][j-1]->dvalue != -1){
          tmp1 = (weight[i][j]->dvalue) - (weight[i][j-1]->dvalue);
           if(myabs(tmp1) > 10)
             weight[i][j]->dvalue = (weight[i][j-1]->dvalue) + (tmp1>>1);
         } if (weight[i-1][j]->dvalue != -1) {
          tmp1 = (weight[i][j]->dvalue) - (weight[i-1][j]->dvalue);
          if (myabs(tmp1) > 10)
             weight[i][j]->dvalue = (weight[i-1][j]->dvalue) + (tmp1>>1);
         }

/*       if (i == 35) printf("\nTEST 3 ");     * DEBUGGING */ if (dopt == 0) rthresh = df[id][j%dsize];
         else rthresh = (float) (rand()) / 2147483647.0;

/*       if (i == 35) printf("\nTEST 4 ");     * DEBUGGING */ fraction = (float)(weight[i][j]->dvalue) / 100.0;

/*       t = temp[j];
```

DITHER.C
Monday, November 18, 1991 12:21 PM

```c
              if (myabs(col2-col1) < 20)
               if ((t == col1) || (t == col2))           */
                temp[j] = (fraction < rthresh) ? col2 : col1;

} /* if temp[j] = col1 or col2 */ j++;
            if(j >= xend-8) flag1 = 1;
            else
            if (activity[ishift][j>>shift] > athresh)
             {j++; flag1 = 1; }
            else
             if (out[i][j] == 1) {
               fraction = (float)(weight[i][j]->dvalue)/100.0;
/*          if (i == 35) printf("\nTEST 5 ");    * DEBUGGING */
            fflush(stdout);
               col1 = weight[i][j]->color1;
               col2 = weight[i][j]->color2;

if (dopt == 0) rthresh = df[id][j%dsize];
            else rthresh = (float) (rand()) / 2147483647.0;
/*          if (i == 35) printf("\nTEST 6 ");    * DEBUGGING */
            fflush(stdout);

t = temp[j];
            if (myabs(col2-col1) < 20)
              if ((t == col1) || (t == col2))      {
              if ((i==36)&&(j==22)) printf("\n(f < t) = %d",(fraction < rthresh));
                temp[j] = (fraction < rthresh) ? col2 : col1;
            }
            if ((i==36) && (j==22)) {
            printf("\nfraction=%f,rthresh=%f,col1=%d,colr=%d,tempj=%d",          fract
            fflush(stdout);
            }
               flag1 = 1;
             }
             else { /* update color counts */
               jmark = (j - jcurrent - 1)%wsize;
               tmp1 = colcount[0][jmark]; tmp2 = colcount[1][jmark];
               colcount[0][jmark] = colcount[1][jmark] = 0;
               jj = j + wsize2;
               for (ii = i-wsize2; ii<= i+wsize2; ii++) {
                if(quant[ii][jj] == col1) colcount[0][jmark] ++;
                else if (quant[ii][jj] == col2) colcount[1][jmark]++;
               }
               sum1 = colcount[0][jmark] + sum1 - tmp1;
               sum2 = colcount[1][jmark] + sum2 - tmp2;

} /* else */
          } /* else */
        } /* while */

} /* else (flag = 1) */
```

```
DITHER.C
Monday, November 18, 1991  12:21 PM

} /* else (out[i][j] == 0) */
       } /* while (j < xend - 8) */ write(fout,temp,mwidth);
      } /* i */ for (ii=i; ii<mheight; ii++) {
       read(fqo,temp,mwidth);
       write(fout,temp,mwidth);
       }

/*    printf("\nFractions for a given column 50\n\n");
      for (i=85; i<105; i++)
        printf("%d   %5.2f\n",i,(float)(weight[i][50]->dvalue)/100.0);
*/ printf("\n");
} /* main */
/*********************************************************************/ struct gradient *gradalloc()
{
     char *malloc(), *p;

p = malloc(sizeof(struct gradient));
     if (p == NULL) {printf("\nContours.c - Not Enough Memory \n");
                exit(0); }
     else return ((struct gradient *) p);
}
/*********************************************************************/
struct dither *walloc()
{
     char *malloc(), *p;

p = malloc(sizeof(struct dither));
     if (p == NULL) {printf("\nContours.c - Not Enough Memory \n");
             exit(0); }
     else return((struct dither *) p);
}
/*********************************************************************/
/* function getact computes the local activity in a h x w block.
   The activity measure is the mean absolute deviation  */
float getact(i,j,h,w)
int i,j,h,w;
{
     extern unsigned char lumim[max][max];

int ti,tj,start,mean,myabs(),btotal;
     float sum;

btotal = h * w;   /* # of pels in block */
     if (btotal == 0) {printf("\nERROR - zero block size!\n");
```

```
DITHER.C                                                            Page 16
Monday, November 18, 1991  12:21 PM exit(0); } mean=0; sum=0.0;
/* compute block mean */
    for (ti=i; ti<i+h; ti++)
     for (tj=j; tj<j+w; tj++)
      mean += lumim[ti][tj];

mean  = (float)mean/(float)btotal;

/* compute mean absolute deviation */
    for (ti=i; ti<i+h; ti++)
     for (tj=j; tj<j+w; tj++)
      sum += myabs(lumim[ti][tj] - mean);

/*  sum /= (float) btotal; */
    return(sum);
}
/*****************************************************************/
/*function myabs returns the absolute value of an integer argument*/
int myabs(arg)
int arg;
{
    return((arg >= 0) ? arg : (-1 * arg));
}

/*******************************************************************/
/* function to return nearest integer */
int mynint(arg)
float arg;
{
    float p;
    p = arg - (float)((int) arg);

if (arg >= 0.0) {
     if (p > 0.5) return ((int)arg + 1);
     else         return ((int)arg);
    }
    else
     if (p < -0.5) return ((int) arg - 1);
     else          return ((int) arg);

}
/*******************************************************************/
int sobel(i,j)
int i,j;
{
    extern unsigned char lumim[max][max],lumq[max][max];
    extern int maxgrad;
    extern long int avgrad;

int dx,dy,grad1,grad2,myabs(),value;
```

DITHER.C
Monday, November 18, 1991 12:21 PM

```c
    /* gradient at point (i,j) in quantized image */ dx =  lumq[i+1][j-1] + lumq[i+1][j+1]
            - lumq[i-1][j-1] - lumq[i-1][j+1]
            + ((lumq[i+1][j] - lumq[i-1][j]) << 1);

dy =  lumq[i-1][j+1] + lumq[i+1][j+1]
            - lumq[i-1][j-1] - lumq[i+1][j-1]
            + ((lumq[i][j+1] - lumq[i][j-1]) << 1);

grad1 = myabs(dx) + myabs(dy);

/* gradient at point (i,j) in original image */ dx =  lumim[i+1][j-1] + lumim[i+1][j+1]
             -lumim[i-1][j-1] - lumim[i-1][j+1]
            + ((lumim[i+1][j] - lumim[i-1][j]) << 1);

dy =  lumim[i-1][j+1] + lumim[i+1][j+1]
             -lumim[i-1][j-1] - lumim[i+1][j-1]
            + ((lumim[i][j+1] - lumim[i][j-1]) << 1);

grad2 = myabs(dx) + myabs(dy);
/*      if ((i==237) && (j==302))
           printf("\nat (%d %d),grad1,grad2 = %d  %d\n",i,j,grad1,grad2);
*/
/* for analysis only */
/*      avgrad += grad2;
        maxgrad = (grad2 > maxgrad) ? grad2 : maxgrad;
*/
/*      if (grad2 < 5) cnt1 ++; */

/* difference in gradients */
    /* threshold for flatness is given by externally defined variable - gthresh */
        if ((grad1 < gthresh) || (grad2 < gthresh)) value = 0; /* too flat */
        else
          if (grad1 < grad2) value= 0; /* want contour to have larger slope*/
          else
            value = grad1 - grad2;

return (value);
}
/****************************************************************/
/* median() - computes the median of an image using square window */
/* the image is of dimension width x height */ median()
{
/* external variables: (all known except for output image array) */
      extern int mwidth,mheight,         /* image dimensions */
```

DITHER.C
Monday, November 18, 1991 12:21 PM

```
            xbeg,xend,ybeg,yend,
            ncolors;            /* # of quantization levels*/
/* median window size is in variable "msize" */ extern unsigned char out[max][max],   /* input image */
                quant[max][max]; /* output image */ int i,j,ii,jj;
    int istart,jstart,jend,jmark,
        a[256],mindex,min,flag,sum,msize1;

msize1 = msize/2;
    mindex = (msize*msize)/2;

/* initialization of quant[i][j] = out[i][j]  is assumed */

/* image loop */ istart = ybeg-1;
    for (i=ybeg+msize1; i<yend-msize1; i++){
      istart ++;
      min = 1000;
/* initialize histogram array */
      for (ii=0; ii<ncolors; ii++) a[ii]=0;

/* initialize histogram count for 1st pixel in row */
      for (ii=istart; ii<istart+msize; ii++)
        for (jj=xbeg; jj<xbeg+msize; jj++) {
         a[out[ii][jj]] ++;
         min = (out[ii][jj] < min) ? out[ii][jj] : min;
        } j = xbeg+msize1;
      flag = sum = 0;
      ii = min;

/* go through histogram and obtain median index */
      while ((flag == 0) && (ii<ncolors)) {
        if (a[ii] != 0) {
        sum += a[ii];
        if (sum >= mindex) {quant[i][j] = ii;
                 flag = 1; }
        } /* if */
        ii++;
        } /* while */ jstart = xbeg; jend = xbeg + msize;

/* go through rest of row */
      for (j=xbeg+msize1+1; j<xend-msize1; j++) {
```

```
DITHER.C
Monday, November 18, 1991 12:21 PM                                         Page 19

/* update histogram count */
        for (ii=istart; ii<msize+istart; ii++) {
         a[out[ii][jstart]] --;
         a[out[ii][jend]] ++;
         min = (out[ii][jend] < min) ? out[ii][jend] : min;
         }

/* go through histogram and obtain median index */
        flag = sum = 0;
        ii = min;
        while ((flag == 0) && (ii<ncolors)) {
         if (a[ii] != 0) {
          sum += a[ii];
          if (sum >= mindex) {quant[i][j] = ii;
                    flag = 1; }
         } /* if */
         ii++;
        } /* while */ jstart ++; jend ++;

} /* j */
      } /* i */

} /* median() */
/*******************************************************************/
/* median3() - computes 1-d median filter of length 3 1st in horiz. and
   then in vertical direction */
/* the image is of dimension width x height */ median3()
{
/* external variables: (all known except for output image array) */
    extern int mwidth,mheight,        /* image dimensions */
         xbeg,xend,ybeg,yend;

extern unsigned char out[max][max],   /* input image */
           quant[max][max]; /* output image */ int i,j,midcol[3],a,b,c,middle();

/* initialization of quant[i][j] = out[i][j]  is assumed */

/* image loop */ for (i=ybeg+1; i<yend-1; i++)
     for (j=xbeg+1; j<xend-1;j++) {
      a = out[i-1][j-1];
      b = out[i-1][j];
      c = out[i-1][j+1];
      midcol[0] = middle(a,b,c);
```

DITHER.C
Monday, November 18, 1991 12:21 PM

```
        a = out[i][j-1];
        b = out[i][j];
        c = out[i][j+1];
        midcol[1] = middle(a,b,c);

a = out[i+1][j-1];
        b = out[i+1][j];
        c = out[i+1][j+1];
        midcol[2] = middle(a,b,c);

a = midcol[0];
        b = midcol[1];
        c = midcol[2];
        quant[i][j] = middle(a,b,c);
    } /* j */

} /* median3() */
/*****************************************************************/
int middle(a,b,c)
int a,b,c;
{
    if (a < b) {
      if (b < c) return(b);
      else
       if (a < c) return(c);
       else       return(a);
    }
    else {
      if (a < c) return(a);
      else
       if (b < c) return(c);
       else       return(b);
    }
} /* middle */
/*****************************************************************/
```

We claim:

1. A method for minimizing the contouring effects in a quantized digital image, comprising the steps of:

a) quantizing an original image using a quantizer to produce a quantized image;

b) determining, by a digital computer, the luminance value for each pixel of the original digital image and the quantized version of the original image;

c) determining, by the computer, busy and smooth regions in the original digital image;

d) for smooth regions, determining, by the computer, luminance variations (gradients) in the original digital image for each pixel by a first Sobel operator;

e) for corresponding smooth regions, determining by the computer luminance variations in the quantized digital image for each pixel by a second Sobel operator;

f) determining, by the computer, the difference between the original luminance variations and the quantized luminance variations for each pixel by a differencer coupled to said first Sobel operator and coupled to said second Sobel operator;

g) selecting, by the computer, a threshold value that when exceeded is indicative of the existence of contours;

h) comparing, by the computer, the difference of step f) with the threshold value of step g) and if the threshold is exceeded indexing the presence of a contour at an associated pixel of the quantized image;

i) for each pixel (i,j) of the quantized image searching, by the computer, for a contour index in a window of pixels around each pixel; and j) when a contour index is found, computing a new color to be placed at each pixel (i,j).

2. A method for minimizing the contouring effects in a quantized digital color image, comprising the steps of:

a) generating an original digital color image;

b) quantizing the original digital color image using a quantizer to produce a quantized digital color image of said original digital color image;

c) determining, by a digital computer, the luminance value for each color pixel of the original digital image and the quantized digital color image;

d) determining, by the computer, busy and non-busy (smooth) regions of the original digital color image;

e) for the smooth regions, determining, by the computer, the luminance variations (gradients) in the original digital color image for each pixel;

f) for corresponding smooth regions, determining, by the computer, luminance variations in the quantized digital color image for each pixel;

g) determining, by the computer, the difference between the original luminance variations and the quantized variations for each pixel of the smooth region;

h) selecting, by the computer, a threshold value indicative of contours;

i) comparing, by the computer, the difference of step g) with the selected threshold value of step h) and when the threshold is exceeded marking the presence of a contour at an associated pixel of the quantized digital color image;

j) for each pixel (i,j) of the quantized digital color image, searching, by the computer, for a contour mark in a window of surrounding pixels; and k) when a contour mark is found, determining, by the computer, a new color to place at each pixel (i,j).

3. The method for determining a new color for each pixel (i,j) according to claim 2 wherein step k) is further comprised of the steps of:

i. determining the position of each pixel (i,j) containing the new color;

ii. determining a value of the new color; and iii. replacing the value of each pixel (i,j) by the value of the new color.

4. The method for minimizing the contouring effects in a quantized digital color image according to claim 2 wherein step d) is further comprised of the steps of:

i. dividing the original digital image into blocks of pixels;

ii. determining the average luminance value of the pixels in each of the blocks;

iii. determining a total difference of each individual pixel in the block from the average luminance value; and iv. comparing the total difference value against a threshold value to determine when the threshold value is not exceeded indicating the block is a smooth region.

5. The method according to claim 4 wherein in step iii) the total difference is determined as the summation of the absolute value of the difference of each individual pixel in the block from the average luminance value.

6. The method for minimizing the contouring effects in a quantized digital color image according to claim 4 wherein the average luminance value ($y_p$) of the pixels is determined by:

$$y_p = a^t C_p$$

where $a^t$ is a weighting vector for the pixel and $C_p$ is a color vector of the pixel.

7. The method according to claim 6 wherein $a^t$ is chosen to have the value ¼, ½, ¼.

8. A system for minimizing the contouring effects in a quantized digital image, comprising:

a) a quantizer quantizing an original digital image; and b) a computer coupled to the quantizer, said computer comprising:

means for determining a luminance value for each pixel of an original digital image and a quantized version of the original digital image;

means for determining busy and smooth regions in the digital image;

means for determining for smooth regions of the original digital image the luminance variations (gradients), said means for determining original image luminance variations including a first Sobel operator;

means for determining the luminance variations in the quantized digital image for regions corresponding to the smooth regions of the original digital image for each pixel, said means for determining quantized image luminance variations including a second Sobel operator;

means for determining a difference between the original luminance variations and the quantized luminance variations for each pixel of a smooth region, said means for determining the difference including a differencer coupled to said first Sobel operator and coupled to said second Sobel operator;

means for establishing a threshold value that if exceeded is indicative of an existence of contours;

means for receiving the difference and the threshold value and for comparing the difference with the threshold value and when the threshold is exceeded providing an index, reflecting a presence of a contour at an associated pixel of the quantized image; and search means for searching for a contour index in a window of pixels around each pixel (i,j) of said quantized image and for computing a new color to place at the pixel (i,j) if a contour index is found.

9. The system for minimizing the contouring effects in a quantized digital color image according to claim 8 wherein said means for determining busy and smooth regions is further comprised of:

i. means for dividing the original digital image into blocks of pixels;

ii. means for determining the average luminance value of the pixels in each of the blocks;

iii. means for determining a total difference of each individual pixel in the block from the average luminance value; and iv. means for comparing the total difference value against a threshold value to determine when the threshold value is not exceeded indicating the block is a smooth region.

10. The system according to claim 9 wherein said means for determining busy and smooth regions in the digital image determines a summation of the absolute values of difference between the original luminance value of each individual pixel in the block and the average luminance value of each individual pixel in the block.

11. The system for minimizing the contouring effects in a quantized digital color image according to claim 9 wherein said means for determining a luminance value for each pixel of an original digital image and a quantized version of the original digital image determines the luminance value (Yp) for each pixel by:

$$Y_p - a' C_p$$

where a' is a weighting factor for each pixel and $C_p$ is a color vector of each pixel.

12. The system according to claim 11 wherein a' is chosen to have the value ¼, ½, ¼.

13. The system according to claim 8 and further comprising:

i. means for determining the position of a pixel (i,j) containing the new color; and ii. means for determining the value of the new color and for replacing the value of the pixel (i,j) with the value of the new color.

* * * * *